June 20, 1933.    W. H. RADFORD    1,914,673
TANK SUPPORT
Original Filed May 20, 1929
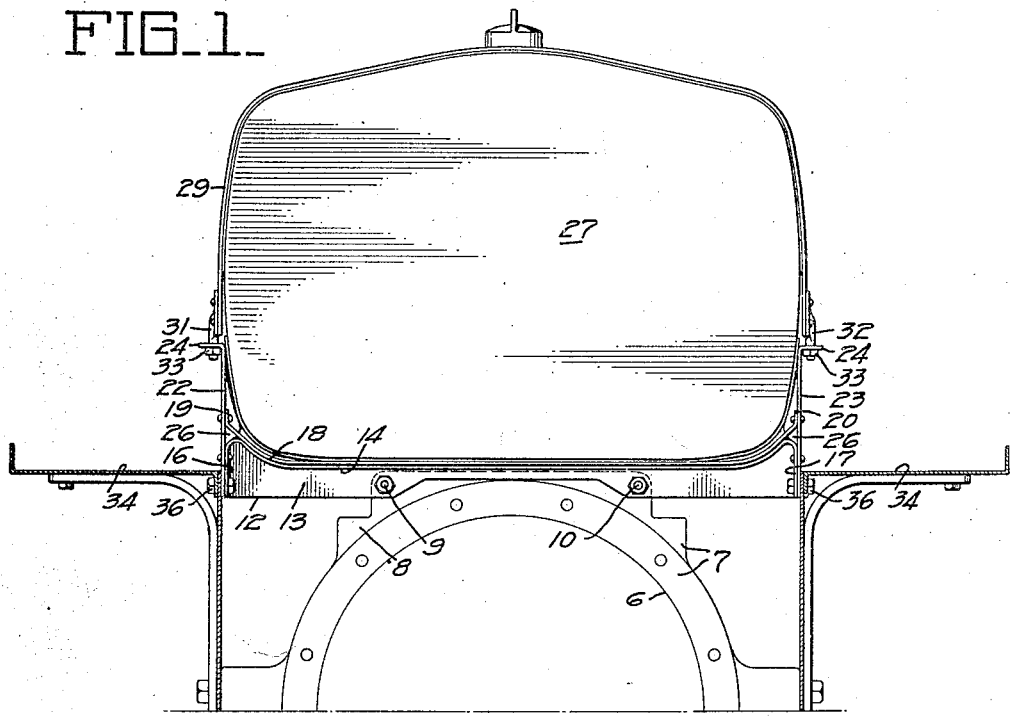
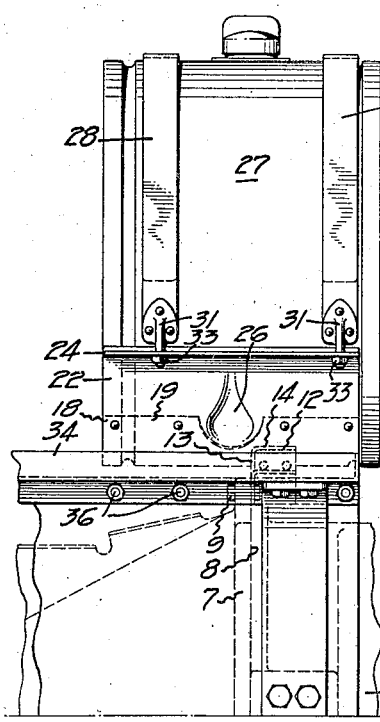
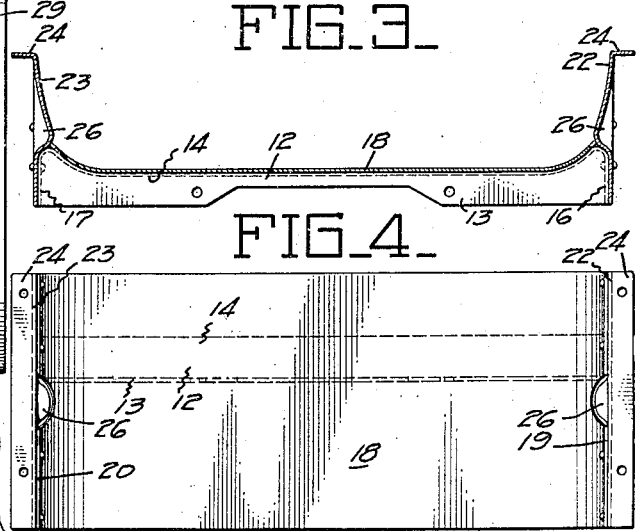
INVENTOR
William H. Radford
BY White, Prost & Fryer
ATTORNEYS Patented June 20, 1933

1,914,673

UNITED STATES PATENT OFFICE

WILLIAM H. RADFORD, OF SAN LEANDRO, CALIFORNIA, ASSIGNOR TO CATERPILLAR TRACTOR CO., OF SAN LEANDRO, CALIFORNIA, A CORPORATION OF CALIFORNIA

TANK SUPPORT

Application filed May 20, 1929, Serial No. 364,656. Renewed May 10, 1930.

My invention relates particularly to tanks for use on vehicles subjected to extremely severe service and is especially concerned with the mounting of fuel tanks on tractors.

An object of my invention is to provide a firm and rigid support for a fuel tank on a vehicle.

Another object of my invention is to provide a tank support of such a character that the tank can easily be installed and removed.

Another object of my invention is to provide a tank support which is simple and economical to manufacture and maintain.

The foregoing and other objects are attained in the embodiment of the invention shown in the drawing, in which Fig. 1 is a transverse section of a tractor on which the tank support of my invention is mounted, the tank support itself being shown in end elevation.

Fig. 2 is a side elevation of the tank support of my invention applied to a tractor.

Fig. 3 is a cross section on a vertical plane of the beam, saddle and end plates comprised in the tank support of my invention.

Fig. 4 is a plan of the beam, saddle and end plates of my tank support.

Although I have chosen to describe the tank support of my invention as it is incorporated in a tractor, it is as well utilized in a number of other different environments in which a firm support must be provided for a tank under extreme conditions of adverse service. As shown in the drawing, the vehicle of which the tank support of my invention forms a part preferably includes a housing 6 having a circular perforated flange 7 affording a peripherally extending pad 8. Connected to the pad by bolts 9 and 10 I preferably provide a beam 12. This beam comprises a member fabricated of pressed metal and having dihedral flanges 13 and 14 terminating in down turned portions 16 and 17 at the opposite ends thereof. Abutting the beam is disposed a saddle 18 also preferably of pressed metal which extends transversely of the vehicle and terminates in vertically disposed ears 19 and 20 coplanar with the portions 16 and 17 of the beam.

Suitably fastened to the extremities of beam 12 and saddle 18 are end plates 22 and 23 likewise preferably constructed of pressed metal. The two end plates are similar in contour and each includes an upper flange 24 and an inwardly deformed portion providing a projection 26 adapted to contact the fuel tank 27 which is placed on saddle 18. The projections 26 being in close contact with tank 27 are effective to constrain transverse movement of the tank and in order to confine the tank against vertical displacement I preferably encompass it with a pair of straps 28 and 29 at their extremities terminating in bolts 31 and 32 adapted to pass through the pierced flanges 24 on end plates 22. The terminus of each of the bolts 31 and 32 is threaded to receive a securing nut 33 by means of which the straps 28 and 29 can be tightly held against the tank and the tank in turn held on its seat on saddle 18.

The described structure is supported on the vehicle by the beam 12 which is attached solely by bolts 9 and 10 and this unit can readily be placed simply by inserting the bolts 9 and 10 in suitably aligned apertures in the extension pad 8 and the beam 12 and the tank can as easily be removed by extracting the bolts 9 and 10 from their respective apertures. In some instances I desire to reinforce the tank support and thus additionally use the end plates 22 as connections for other portions of the vehicle. This is illustrated herein by sides 34 which are secured by bolts 36 to the end plates.

In accordance with my invention I have provided a tank support which is easily and simply attached to and detached from a suitable mounting and which affords a very rigid and firm support for a tank subjected to extremely severe service.

It is to be understood that I do not limit myself to the form of the tank support shown and described herein, as the invention, as set forth in the following claims may be embodied in a plurality of forms.

I claim:

1. A tank support comprising a housing having a flange thereon, a beam secured to said flange, a saddle on said beam, flanged end plates secured to said saddle and to said beam, a tank on said saddle, straps encompassing said tank, and means for securing said straps to said flanged end plates.

2. A tank support comprising a beam, end plates secured to opposite ends of said beam, projections on said end plates, a tank bearing against said projections, and a strap secured to said end plates and overlying said tank.

3. A tank support comprising a housing having a flange thereon, a beam secured to said flange, end plates fastened to opposite ends of said beam, projections on said end plates, a tank bearing against said projections, and means for holding said tank against said projections.

4. A tank support comprising a housing having a flange thereon, a beam secured to said flange, end plates fastened to opposite ends of said beam, projections on said end plates, a saddle resting on said beam and fastened to said end plates, a tank bearing against said projections and resting on said saddle, and straps encompassing said tank and fastened to said end plates for holding said tank against said projections and said saddle.

5. A support for a tank comprising a member conforming to the configuration of said tank and in engagement substantially with the entire bottom portion of said tank, a beam for supporting said member, and side plates on said beam substantially continuing said member and engaging sides of said tank.

6. A tank support comprising spaced end plates substantially coextensive with the sides of a tank to be supported, a member conforming to the configuration of said tank and in engagement substantially with the entire bottom portion of said tank, and means rigidly uniting the member and end plates.

7. A tank support comprising spaced end plates substantially coextensive with the sides of a tank to be supported, a member conforming to the configuration of said tank and in engagement substantially with the entire bottom portion of said tank, means rigidly uniting the member and end plates, and means for holding the tank down over the member.

8. A support for a tank comprising a member conforming to the configuration of said tank and in engagement substantially with the entire bottom portion of said tank, a beam for supporting said member, side plates adjacent the ends of said beam and substantially continuing said member to engage the sides of said tank, and means rigidly uniting the beam, side plates and member.

9. A tank support comprising a housing having a flange thereon, a beam secured to said flange, a saddle on said beam, end plates rigidly secured at the ends of said beam and saddle, a tank adapted to be positioned over said saddle and between said end plates, and means secured to the end plates for holding the tank down against the saddle.

10. A tank support comprising a housing having a flange thereon, a beam secured to said flange, a saddle on said beam, end plates rigidly secured at the ends of said beam and saddle, a tank adapted to be positioned over said saddle and between said end plates, and means for holding the tank down against said saddle.

11. A tank support for rigidly mounting a tank in a vehicle for movement as a unit therewith comprising support means including supports spaced apart a distance substantially equal to the width of said tank, a sheet of metal having a width substantially equal to the length of said tank and attached at each end to said spaced apart supports, said tank being placed on said sheet between said supports and contacting said sheet, and securing means for holding said tank in position on said support means, said securing means being connected to said spaced apart supports.

12. A tank support for rigidly mounting a tank in a vehicle for movement as a unit therewith, comprising support means having a tank-engaging surface conforming to the configuration of said tank, the area of the horizontal projection of said tank-engaging surface being substantially equal to the area of the horizontal projection of said tank, means for securing said tank on said support means to maintain contact between said tank and said tank-engaging surface, and common means to which said support means and said securing means are attached.

In testimony whereof, I have hereunto set my hand.

WILLIAM H. RADFORD.